US008883234B2

(12) United States Patent
Choi (10) Patent No.: US 8,883,234 B2
(45) Date of Patent: Nov. 11, 2014

(54) FERMENTER AND MICROWAVE OVEN HAVING THE SAME, THEIR CONTROLLING METHOD

(75) Inventor: Sung-Ho Choi, Daegu (KR)

(73) Assignee: LG Electronics Inc., Seoul (KR)

( * ) Notice: Subject to any disclaimer, the term of this patent is extended or adjusted under 35 U.S.C. 154(b) by 1684 days.

(21) Appl. No.: 12/067,489

(22) PCT Filed: Sep. 25, 2006

(86) PCT No.: PCT/KR2006/003807
§ 371 (c)(1),
(2), (4) Date: Mar. 20, 2008

(87) PCT Pub. No.: WO2007/035068
PCT Pub. Date: Mar. 29, 2007

(65) Prior Publication Data
US 2008/0248157 A1    Oct. 9, 2008

(30) Foreign Application Priority Data

Sep. 23, 2005 (KR) .................. 10-2005-0088910
Oct. 17, 2005 (KR) .................. 10-2005-0097694

(51) Int. Cl.
*H05B 6/68* (2006.01)
*H05B 6/64* (2006.01)
*A23L 1/025* (2006.01)
*H05B 6/80* (2006.01)
*A23C 9/12* (2006.01)

(52) U.S. Cl.
CPC ............ *H05B 6/6402* (2013.01); *A23L 1/0255* (2013.01); *A23C 9/1226* (2013.01); *H05B 6/645* (2013.01); *H05B 6/80* (2013.01); *H05B 6/68* (2013.01)
USPC ............... 426/7; 426/231; 426/241; 219/679; 219/685; 219/710; 219/719

(58) Field of Classification Search
CPC .... A23C 9/122; A23C 9/1226; A23L 1/0255; H05B 6/6447–6/6455
USPC ........ 426/231, 7, 49, 241–243; 219/679, 702, 219/710–713, 719, 680, 685
See application file for complete search history.

(56) References Cited

U.S. PATENT DOCUMENTS 3,332,370 A * 7/1967 Brastad .................. 426/243
6,012,383 A    1/2000 Lande'
2003/0085218 A1  5/2003 Kauschke et al.

FOREIGN PATENT DOCUMENTS

EP    0 503 898    9/1992
GB    2 330 921    5/1999
(Continued)

OTHER PUBLICATIONS

Korean Patent Office Machine Translation of KR 1020020085290.*

(Continued)

*Primary Examiner* — Drew Becker
(74) *Attorney, Agent, or Firm* — KED & Associates, LLP (57) ABSTRACT

A fermenter, a microwave oven including the fermenter, and a method of controlling the fermenter and microwave oven are provided. The fermenter includes a fermenter casing having one side open and defining a fermenting chamber, a fermenter door that selectively opens or closes the fermenting chamber, a thermoelectric element that applies heat to the fermenting chamber or absorbs heat from the fermenting chamber, and a current switching device that converts current supplied to the thermoelectric element such that the thermoelectric element absorbs or generates heat. The fermenter may be very conveniently employed and a microwave oven with various functions may also be provided.

10 Claims, 7 Drawing Sheets

(56) References Cited

FOREIGN PATENT DOCUMENTS

| | | | |
|---|---|---|---|
| JP | 01179824 A | * | 7/1989 |
| JP | 3-92982 | | 9/1991 |
| JP | 08110054 A | * | 4/1996 |
| JP | 2003-343847 | | 12/2003 |
| KR | 1990-0002708 | | 3/1990 |
| KR | 9204076 B | * | 5/1992 |
| KR | 950014028 B1 | * | 11/1998 |
| KR | 10-2001-0084061 | | 9/2001 |
| KR | 2001084061 A | * | 9/2001 |
| KR | 10-2004-0059611 | | 7/2004 |
| KR | 10-2004-0059612 | | 7/2004 |
| KR | 100519289 B1 | * | 10/2005 |
| KR | 2005115982 A | * | 12/2005 |

OTHER PUBLICATIONS etutorials.org (Peltier Modules).*
Translation of KR 924076B.*
European Search Report dated Jul. 4, 2012.
European Search Report dated Feb. 21, 2013.

* cited by examiner

Related Art

Figure 7
Related Art

FERMENTER AND MICROWAVE OVEN HAVING THE SAME, THEIR CONTROLLING METHOD

TECHNICAL FIELD

The present invention relates to a microwave oven, and more particularly, to a fermenter capable of fermenting food, a microwave oven including the fermenter, and a method of controlling the fermenter and microwave oven.

BACKGROUND ART

Figure 6:
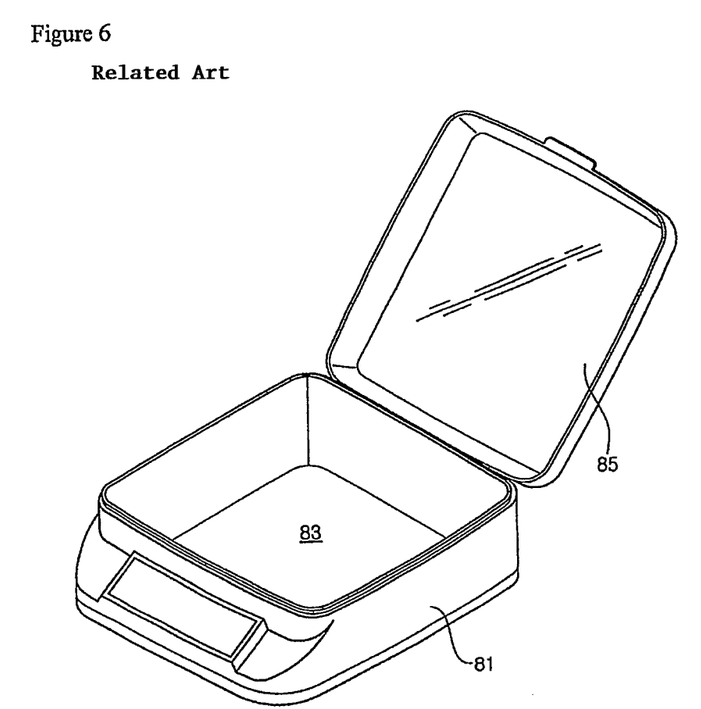
FIG. 6 is a perspective view showing a related art fermenter.

FIG. 6 is a perspective view of a related art fermenter.

As shown in the figure, a predetermined accommodating space 83 in which food to be fermented is received is provided in a main body 81 of a fermenter. In addition, a heater (not shown) for heating food received in the accommodating space 83 is provided at the interior of the main body 81 adjacent to a bottom surface and/or peripheral surface of the accommodating space 83.

Further, a cover 85 is pivotally installed to one side of the body 81. The cover 85 serves to selectively open or close the accommodating space 83 in such a manner that a front end thereof is vertically rotated about a rear end thereof.

Figure 7:
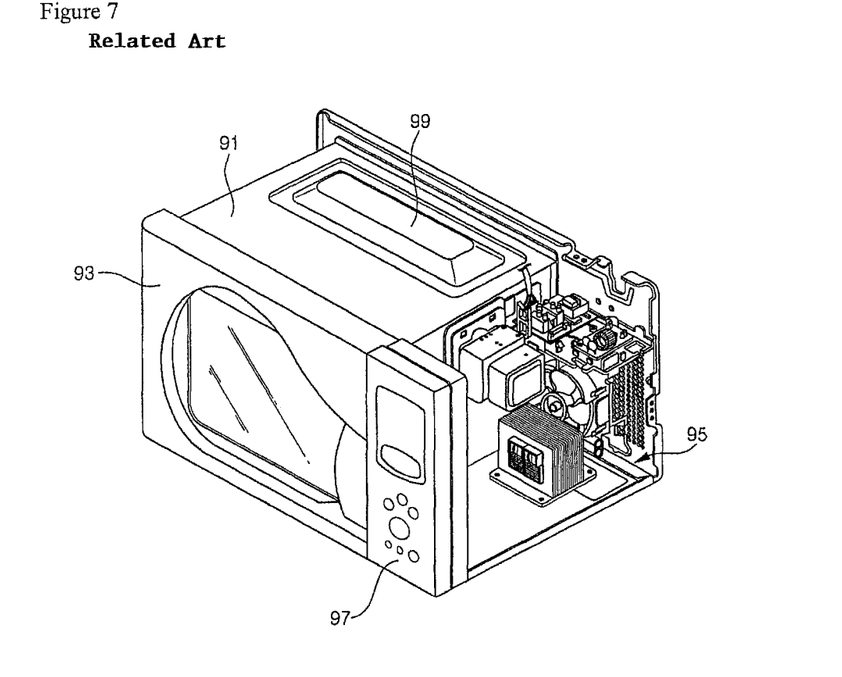
FIG. 7 is a perspective view showing a related art microwave oven.

FIG. 7 is a perspective view of a related art microwave oven.

As shown in the figure, a cooking chamber is provided in a cavity 91 of the microwave oven. Food is cooked in the cooking chamber, and a door 93 is provided to one side of the cavity 91 to selectively open or close the cooking chamber. The door 93 is installed pivotally to the side of the cavity 91 in a front and rear direction of the cavity 91.

An electric apparatus chamber 95 is provided in a portion of the cavity 91 opposite to the cooking chamber. A variety of electric parts for oscillating microwaves are installed in the electric apparatus chamber 95. In addition, a control unit 97 for receiving various signals used to operate the microwave oven and displaying a variety of information on the operation of the microwave oven is provided to the front of the electric apparatus chamber 95.

Further, a heater (not shown) is provided to a top surface of the cavity 91 which corresponds to the ceiling of the cooking chamber. The heater is used to provide heat, which is another heat source other than microwaves, and a heater cover 99 is provided to cover the heater.

However, the related art fermenter and microwave oven configured as above have the following problems.

If food which is heated and fermented by means of the heater is stored for a long time in the accommodating space 83, it can either be fermented excessively or go bad due to heat remaining in the accommodating space 83 even though the heater is stopped. Thus, there is inconvenience in that a user should take the fermented food out of the accommodating space 83 and then store it in another place such as a refrigerator.

In addition, an electronic product having various functions, for example a product having an additional Internet function together with the existing functions such as an Internet refrigerator, is recently put into the market. However, as described above, the conventional microwave oven has no further function other than cooking, thus not satisfying the demand of consumers.

In addition, an electronic appliance having various functions, for example, an Internet refrigerator having the existing functions in addition to an Internet function has been recently put into the market. As described above, however, the related art microwave oven has no additional function other than the cooking function. Therefore, there is a problem in that the aforementioned needs of consumers cannot be satisfied.

DISCLOSURE

Technical Problem

The present invention is conceived to solve the above problem in the prior art. Accordingly, it is an object of the present invention to provide a fermenter which can be used in a more convenient way, a microwave oven including the fermenter, and a method of controlling the fermenter and microwave oven.

It is another object of the present invention to provide a fermenter with various functions, a microwave oven including the fermenter, and a method of controlling the fermenter and microwave oven.

Technical Solution

According to an aspect of the present invention for achieving objects, there is a fermenter, comprising: a fermenter casing having one open side and defining a fermenting chamber; a fermenter door for selectively opening or closing the fermenting chamber; a thermoelectric element for applying heat to the fermenting chamber or absorbing heat from the fermenting chamber; and a current switching device for converting current supplied to the thermoelectric element such that the thermoelectric element can absorb or generate heat.

Preferably, there is further comprising a control unit for controlling an operation of the thermoelectric element according to a set condition or an internal temperature of the fermenting chamber and displaying an operation state of the thermoelectric element to the outside.

More preferably there is further comprising: a temperature sensor for detecting an internal temperature of the fermenting chamber; and a safety device for cutting off current converted by the current switching device and then supplied to the thermoelectric element when the internal temperature of the fermenting chamber detected by the temperature sensor is above or below a predetermined value.

The fermenting chamber is partitioned into upper and lower spaces by means of a partition detachably installed thereto in a horizontal direction.

According to another aspect of the present invention for achieving objects, there is a microwave oven, comprising: a cavity having a cooking chamber provided to one side thereof to cook food and an electric apparatus chamber provided to an opposite side to the cooking chamber to install a variety of electric parts; and a fermenter provided in the front of the electric apparatus chamber.

Preferably a shielding plate is installed between the fermenter and the electric parts installed in the electric apparatus chamber to prevent heat transfer between the electric parts and the fermenter.

According to another aspect of the present invention for achieving objects, there is a method of controlling a fermenter and a microwave oven including the fermenter, comprising the steps of: (a) receiving a set value of a fermentation temperature by a control unit; (b) controlling the supply of current for allowing a thermoelectric element to generate heat; (c) generating heat from the thermoelectric element by the current supplied in step (b) to ferment food accommodated in the fermenting chamber; (d) detecting an internal temperature of the fermenting chamber by a temperature sensor; and (e) controlling cutting off the current supplied to the thermoelectric element, by the control unit, when the internal temperature of the fermenting chamber detected in step (c) reaches the fermentation temperature set in step (a).

Preferably step (e) comprises the steps of: (e1) comparing the fermentation temperature set in step (a) with the internal temperature of the fermenting chamber detected in step (c), by the control unit; (e2) controlling cutting off the current supplied to the thermoelectric element, by the control unit, when the internal temperature of the fermenting chamber detected in step (c) reaches the fermentation temperature set in step (a); and (e3) cutting off the current supplied to the thermoelectric element, by a safety device, when the control unit controls the continuous supply of current to the thermoelectric element in step (e2) and the internal temperature of the fermenting chamber detected in step (c) is greater than the fermentation temperature set in step (a) by a predetermined value.

According to another aspect of the present invention for achieving objects, there is a method of controlling a fermenter and a microwave oven including the fermenter, comprising the steps of: (a) receiving set values of fermentation and storage temperatures by a control unit; (b) controlling the supply of current for allowing a thermoelectric element to generate heat; (c) generating heat from the thermoelectric element by the current supplied in step (b) to ferment food accommodated in the fermenting chamber; (d) detecting an internal temperature of the fermenting chamber by a temperature sensor; (e) controlling the supply of current for allowing the thermoelectric element to absorb heat, by the control unit, when the internal temperature of the fermenting chamber detected in step (c) reaches the fermentation temperature set in step (a); (f) detecting the internal temperature of the fermenting chamber by the temperature sensor; and (g) controlling cutting off the current supplied to the thermoelectric element, by the control unit, when the internal temperature of the fermenting chamber detected in step (f) reaches the storage temperature set in step (a).

Preferably step (e) comprises the steps of: (e1) comparing the fermentation temperature set in step (a) with the internal temperature of the fermenting chamber detected in step (c), by the control unit; (e2) controlling the supply of current for allowing the thermoelectric element to absorb heat, by the control unit, when the internal temperature of the fermenting chamber detected in step (c) reaches the fermentation temperature set in step (a); and (e3) cutting off the current supplied to the thermoelectric element, by a safety device, when the control unit controls the continuous supply of current to the thermoelectric element in step (e2) and the internal temperature of the fermenting chamber detected in step (c) is greater than the fermentation temperature set in step (a) by a predetermined value.

More preferably step (g) comprises the steps of: (g1) comparing the storage temperature set in step (a) with the internal temperature of the fermenting chamber detected in step (f), by the control unit; (g2) controlling cutting off the current supplied to the thermoelectric element, by the control unit, when the internal temperature of the fermenting chamber detected in step (f) reaches the storage temperature set in step (a); and (g3) cutting off the current supplied to the thermoelectric element, by a safety device, when the control unit controls the continuous supply of current to the thermoelectric element in step (g2) and the internal temperature of the fermenting chamber detected in step (f) is lower than the storage temperature set in step (a) by a predetermined value.

According to another aspect of the present invention for achieving objects, there is a microwave oven including a fermenter, comprising: a cavity having a cooking chamber provided to one side thereof to cook food and an electric apparatus chamber provided to an opposite side to the cooking chamber to install a variety of electric parts; a fermenter casing provided in the front of the electric apparatus chamber, the ferment casing having one open side and defining a fermenting chamber; a fermenter door provided to one side of the fermenter casing to selectively open or close the fermenting chamber; a heating means provided to another side of the fermenter casing to heat the fermenting chamber; and a control unit for controlling an operation of the heating means according to a set condition or an internal temperature of the fermenting chamber and displaying an operating state of the heating means to the outside.

Preferably a shielding plate is installed between the fermenting chamber and the electric parts installed in the electric apparatus chamber to prevent heat transfer between the electric parts and the fermenting chamber.

More preferably the fermenting chamber is partitioned into upper and lower spaces by means of a partition detachably installed thereto in a horizontal direction.

The heating means is a fermenting heater which is bent into a serpentine shape to surround an outer surface of the fermenter casing.

Preferably a temperature sensor for detecting an internal temperature of the fermenting chamber and sending the detected internal temperature to the control unit is provided to one side of the fermenter casing.

According to another aspect of the present invention for achieving objects, there is a method of controlling a microwave oven including a fermenter, comprising the steps of: (a) receiving set values of a fermentation temperature and a fermenting time, by a control unit; (b) detecting, by a temperature sensor, an initial temperature of food to be fermented, which is accommodated in a fermenting chamber; (c) calculating a time interval taken to heat the food from the initial temperature detected in step (b) to the fermentation temperature inputted in step (a), by the control unit; (d) controlling irradiating microwaves into a cooking chamber during the time interval calculated in step (c) to heat the food placed in the cooking chamber, by the control unit; (e) controlling operating a fermenting heater, by the control unit, when a temperature of the food reaches the fermentation temperature set in step (a); and (f) stopping the fermenting heater, by the control unit, when the fermenting heater is operated for the fermenting time set in step (a).

Preferably step (e) comprises the steps of: (e1) operating the fermenting heater by the control unit; (e2) detecting an internal temperature of the fermenting chamber by the temperature sensor; (e3) comparing, by the control unit, the fermentation temperature set in step (a) with the internal temperature of the fermenting chamber detected in step (e2); and (e4) operating or stopping, by the control unit, the fermenting heater to allow the internal temperature of the fermenting chamber detected in step (e2) to be equal to or lower than the fermentation temperature set in step (a).

Advantageous Effects

According to the present invention, the fermenter can be used in a more convenient way and the microwave oven with various functions can be provided.

BEST MODE

Hereinafter, a fermenter, a microwave oven including the fermenter, and a method of controlling the fermenter and microwave oven according to preferred embodiments of the present invention will be described in detail with reference to the accompanying drawings.

Figure 1:
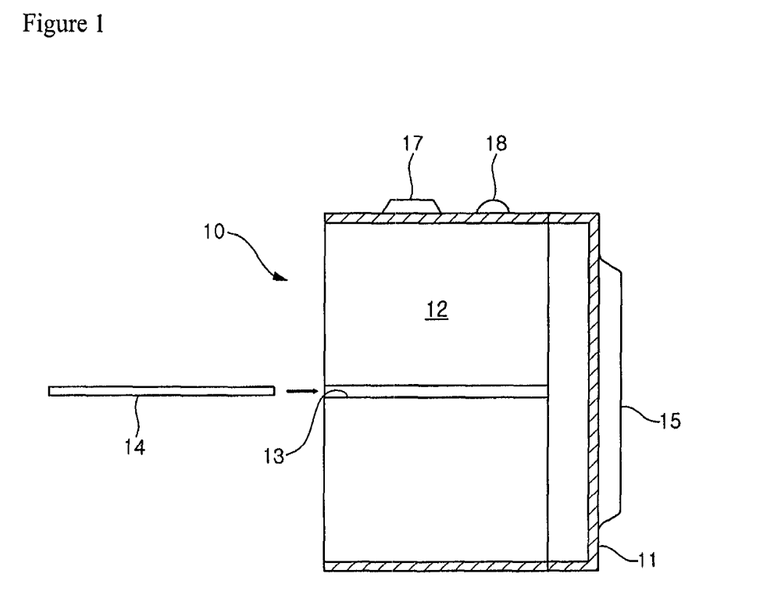
FIG. 1 is a side sectional view showing a fermenter according to a preferred embodiment of the present invention.
Figure 2:
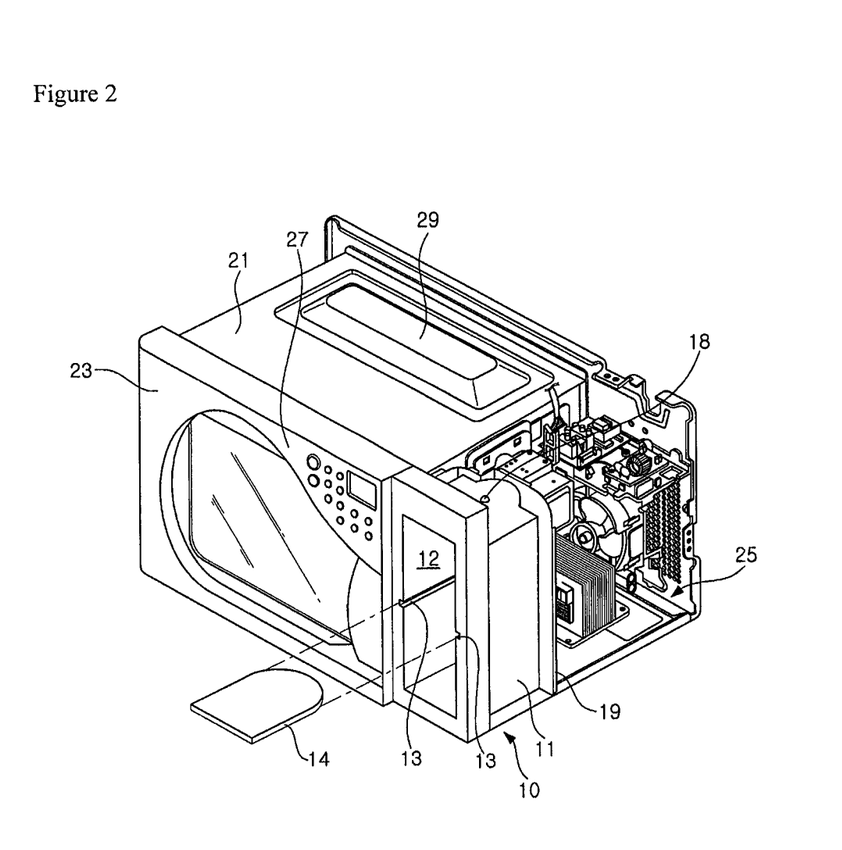
FIG. 2 is an exploded perspective view showing a microwave oven including the fermenter according to a preferred embodiment of the present invention.

FIG. 1 is a side sectional view showing a fermenter according to a preferred embodiment of the present invention, and FIG. 2 is an exploded perspective view showing a microwave oven including the fermenter according to a preferred embodiment of the present invention.

As shown in the figures, an external appearance of a fermenter 10 is defined by a fermenter casing 11. The fermenter casing 11 generally takes the shape of a hexahedron with an open front side. Further, a fermenting chamber 12 is provided in the fermenter casing 11. The fermenting chamber 12 is a place where food is fermented, and food to be fermented is taken in or out of the fermenting chamber through the open front side of the casing.

Seating grooves 13 are formed in both lateral sides of the fermenting chamber 12, respectively. The seating grooves 13 are formed in such a manner that both lateral sides of the fermenting chamber 12 are partially depressed at a predetermined depth. In this embodiment of the present invention, each of the seating grooves 13 is formed at a middle portion of the lateral side of the fermenting chamber 12 to extend in a front and rear direction.

In addition, both lateral ends of a partition 14 are inserted into the seating grooves 13, respectively. The partition 14 is used to partition an inner space of the fermenting chamber 12 into upper and lower regions depending on the size and amount of food accommodated in the fermenting chamber 12, and is shaped into a plate corresponding to a horizontal section of the fermenting chamber 12. The partition 14 is detachably installed in the fermenting chamber 12 in a horizontal direction.

Further, a fermenter door (not shown) is provided to selectively open and close the fermenting chamber 12. Preferably, the fermenter door is made at least partially of a transparent or translucent material such that a user can view the fermenting chamber 12 with his/her naked eyes.

Furthermore, a thermoelectric element 15 is installed at an outer side of the fermenter casing 11. The thermoelectric element 15 serves to supply the fermenting chamber 12 with heat or to absorb heat from the fermenting chamber 12, so that food can be substantially fermented in the fermenting chamber. In this embodiment of the present invention, the thermoelectric element 15 is installed in such a manner that one side thereof is brought into close contact with a rear side of the fermenter casing 11, but the present invention is not limited thereto.

The thermoelectric element 15 may be a Peltier element, for example. This Peltier element can generate or absorb heat depending on the supplied current, and can also control an amount of heat generated or absorbed depending on an amount of the supplied current. The thermoelectric element 15 generates heat at one side thereof and absorbs heat at the other side depending on the supplied current. That is, in the process of fermenting food accommodated in the fermenting chamber 12, current is supplied such that heat can be generated from one side of the thermoelectric element 15 brought into close contact with the rear side of the fermenter casing 11. As a result, the internal temperature of the fermenting chamber 12 will be increased. After the food accommodated in the fermenting chamber 12 has been completely fermented, current is supplied such that heat is absorbed from the side of the thermoelectric element 15 brought into close contact with the rear side of the fermenter casing 11. As a result, the internal temperature of the fermenting chamber 12 will be decreased.

To this end, a current switching device (not shown) is provided to convert the current supplied to the thermoelectric element 15. The current switching device serves to convert current supplied from the outside and then supply the converted current to the thermoelectric element such that the thermoelectric element 15 can generate or absorb heat.

In addition, a temperature sensor 17 is installed to a portion on a top surface of the fermenter casing 11. The temperature sensor 17 senses the internal temperature of the fermenting chamber 12 and transmits temperature data to a control unit 27, which will be explained later. For example, the temperature sensor 17 may be a thermostat.

Further, a temperature fuse 18 is provided at a portion on the top surface of the fermenter casing 11. The temperature fuse 18 serves to cut off the current, which is converted by the current switching device and then supplied to the thermoelectric element 15, when the internal temperature of the fermenting chamber 12 is increased above or decreased below a set fermentation temperature or storage temperature, which is inputted to the control unit 27 to be explained later, by a predetermined value due to the heat generation or absorption of the thermoelectric element 15.

The fermenter 10 configured as above may be installed to one side of a microwave oven. That is, as shown in FIG. 2, both a cooking chamber (not shown) and an electric apparatus chamber 25 are provided in a cavity 21 of the microwave oven. The fermenter 10 is provided in the front of the electric apparatus chamber 25. At this time, the fermenter 10 is installed in such a manner that the open front side of the fermenting chamber 12 is directed to the front of the cavity 21.

A shielding plate 19 is installed in the electric apparatus chamber 25 corresponding to a region between electric parts installed in the electric apparatus chamber 25 and the fermenter casing 11. The shielding plate 19 serves to prevent heat exchange between the thermoelectric element 15 and the electric parts installed in the electric apparatus chamber 14. The shielding plate 19 is made of a material capable of sufficiently shielding heat from the thermoelectric element 15.

In addition, a door 23 is installed to selectively open or close the cooking chamber. The door 23 is installed pivotally to one side of the cavity 21 in a front and rear direction of the cavity 21. In addition, the door 23 is formed of the same material as the fermenter door, so that an integral sense of the front external appearance of the microwave oven can be obtained.

The control unit 27 is installed to a portion of the door 23. The control unit 27 receives various signals used to operate the microwave oven and the fermenter 10 and displays a variety of information on the operation of the microwave oven and the fermenter 10 to the outside. In addition, the control unit 27 serves to control the microwave oven and the fermenter 10 in accordance with an internal temperature or predetermined conditions, such as a fermenting and storage temperature, of the cooking chamber or fermenting chamber 12. In particular, the control unit 27 receives an internal temperature of the fermenting chamber 12 sensed by the temperature sensor 17 to control the fermenter 10.

Although it has been described in this embodiment of the present invention that the controller 27 installed to the door 23 receives various signals used to operate the microwave oven and the fermenter 10 and displays a variety of information on the operation of the microwave oven and the fermenter 10, but the present invention is not limited thereto. That is, an additional control unit for operating the fermenter 10 can be installed to one side of the door 23 or the fermenter 10.

Reference numeral 29 (not yet illustrated) designates a heater cover. The heater cover 29 serves to cover a heater which becomes a heat source for cooking food placed in the cooking chamber.

Next, a method of controlling a microwave oven including a fermenter according to a preferred embodiment of the present invention will be described in more detail with reference to the accompanying drawings.

Figure 3:
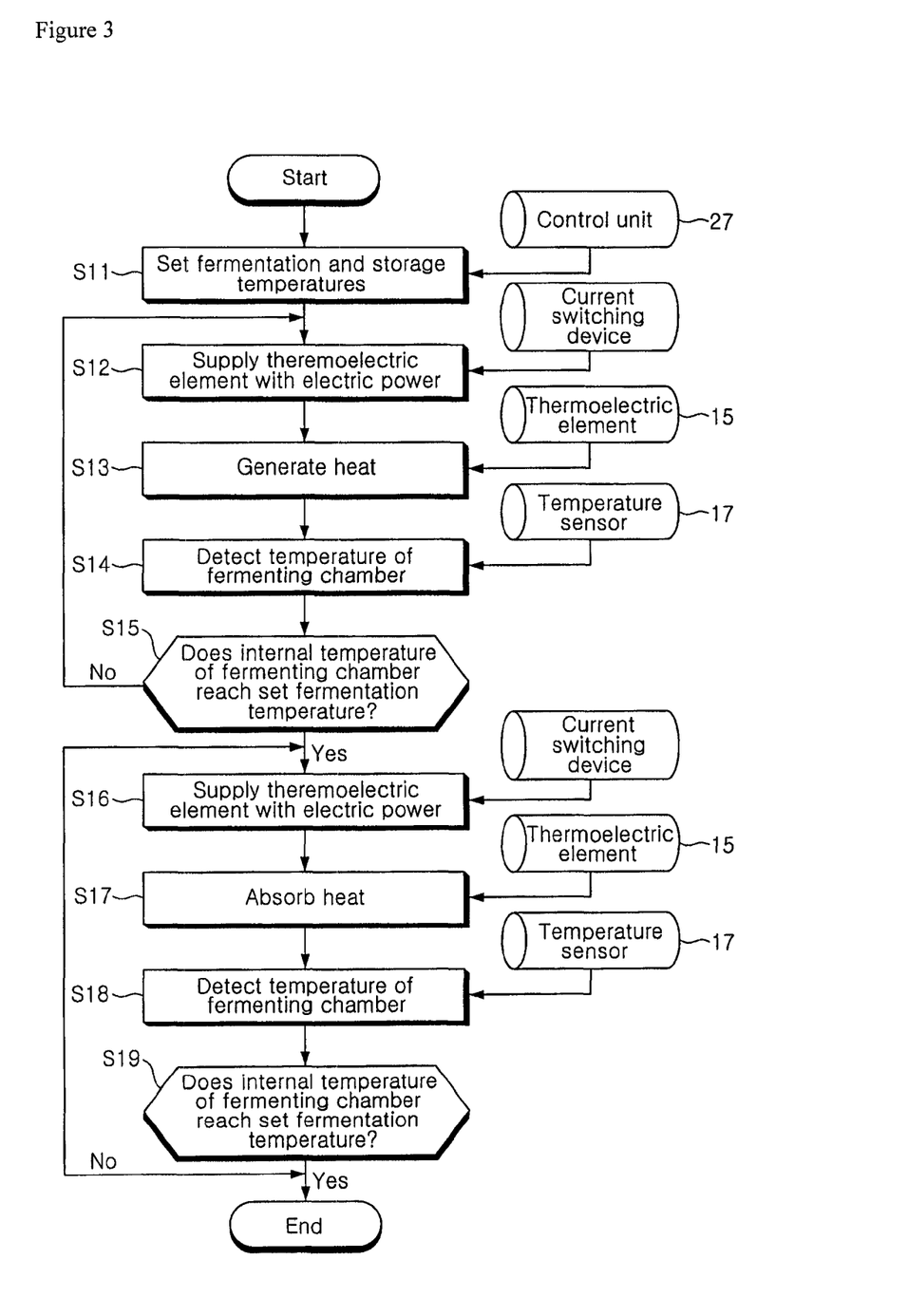
FIG. 3 is a flowchart illustrating a method of controlling the microwave oven including the fermenter according to a preferred embodiment of the present invention.

FIG. 3 is a flowchart illustrating a method of controlling a microwave oven including a fermenter according to a preferred embodiment of the present invention.

As shown in the figure, the fermenter door is opened to open the fermenting chamber 12. Food to be fermented is accommodated in the fermenting chamber 12, and the fermenter door is then closed to close the fermenting chamber 12. At this time, the partition 14 may be selectively installed in the fermenting chamber 12 depending on the size and amount of the food.

For example, when milk is fermented to make yogurt, the fermenting chamber 12 is partitioned depending on the number of cups containing milk to be fermented. That is, in order to fill two cups of 200 ml with milk and ferment the two cups of milk, the partition 14 is installed within the fermenting chamber 12 and the two cups of milk are placed on a floor surface of the fermenting chamber 12 and a top surface of the partition 14, respectively. However, when milk is filled into a cup of 500 ml and is then fermented, the partition 14 is removed from the fermenting chamber 12 and the cup is then placed on the floor surface of the fermenting chamber 12.

In addition, if food is accommodated in the fermenting chamber 12, the control unit 27 is operated to set the fermentation and storage temperatures depending on the kind and amount of the food (S11). Then, the control unit 27 controls the supply of current suitable for the thermoelectric element 15 such that heat can be generated from one side of the element brought into close contact with the rear side of the fermenter casing 11. The current conversion is made by the current switching device (S12). Thus, if the heat from the thermoelectric element 15 is transferred to the interior of the fermenting chamber 12 to heat the food, the food is fermented through a catalytic reaction due to enzymes already added to the food (S13).

While the food is being fermented, the temperature sensor 17 senses the internal temperature of the fermenting chamber 12 and transmits the sensed temperature to the control unit 27 (S14). If the internal temperature of the fermenting chamber 12 received from the temperature sensor 17 reaches the set fermentation temperature, the control unit 27 controls the supply of current suitable for thermoelectric element 15 by the current switching device such that heat can be absorbed from the side of the element brought into close contact with the rear side of the fermenter casing 11 (S15 and S16). Thus, the thermoelectric element 15 absorbs heat from the fermenting chamber 12, and thus, the internal temperature of the fermenting chamber 12 will be lowered (S17).

In addition, the temperature sensor 17 again senses the internal temperature of the fermenting chamber 12 and then sends the sensed temperature to the control unit 27 (S18). If the internal temperature of the fermenting chamber 12 detected by the temperature sensor 17 reaches the set storage temperature, the control unit 27 cuts off the current supplied to the thermoelectric element 15 (S19).

Thus, the internal temperature of the fermenting chamber 12 is lowered due to the absorption of heat by the thermoelectric element 15 and is kept at a predetermined value where the freshness of food can be maintained. Therefore, even though the fermented food is stored in the fermenting chamber 12 for a long time due to the absence of a user, the food in the fermenting chamber 12 is neither excessively fermented nor goes bad.

Then, in order to take out the food stored in the fermenting chamber 12, a user opens the fermenter door to open the fermenting chamber 12. The user picks out the food in the fermenting chamber 12 to eat the food directly or use the food for further cooking.

Furthermore, when the internal temperature of the fermenting chamber 12 detected by the temperature sensor 17 during the heat absorption or generation process of the thermoelectric element 15 is increased above or decreased below the set fermentation or storage temperature by a predetermined value, the current supplied from the current switching device to the thermoelectric element 15 is cut off by means of the temperature fuse 18. Thus, the internal temperature of the fermenting chamber 12 is not excessively increased or decreased regardless of the heat generation or absorption of the thermoelectric element 15, so that the food can be prevented from being excessively fermented or frozen.

In addition, the shield plate 19 installed between the fermenter casing 11 and electric parts in the electric apparatus chamber 25 prevents the heat transfer from the thermoelectric element 15 to the electric parts. Thus, while the thermoelectric element 15 generates heat to operate the fermenter 10, it is possible to prevent the electric parts in the electric apparatus chamber 25 from being damaged.

Mode for Invention

Hereinafter, a microwave oven including a fermenter and a method of controlling the microwave oven according to another embodiment of the present invention will be explained in detail with reference to the accompanying drawings.

Figure 4:
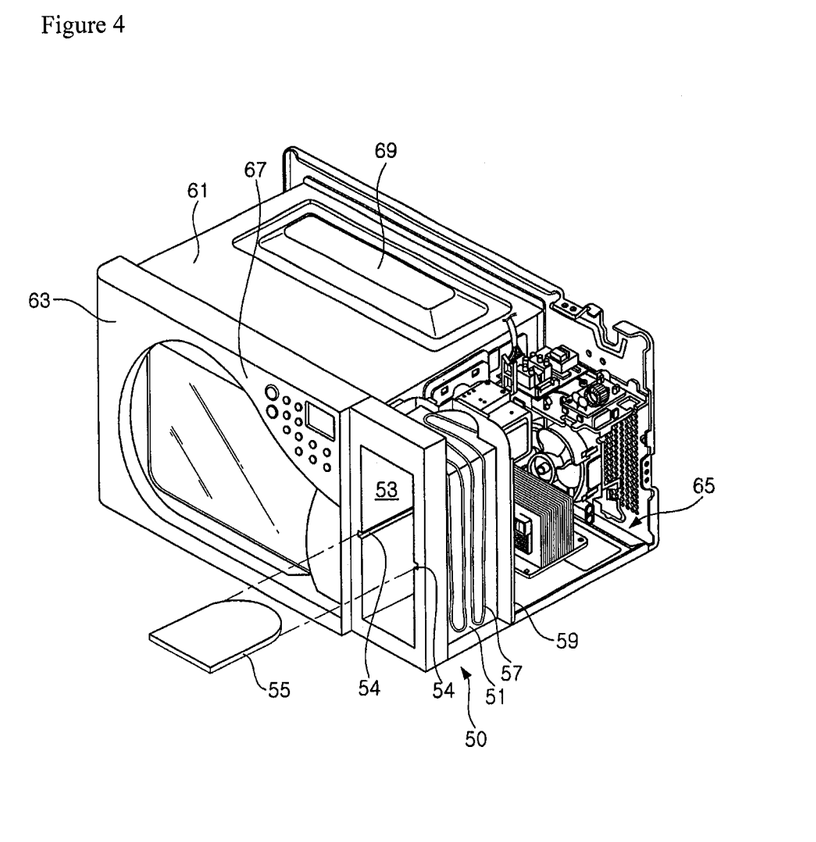
FIG. 4 is an exploded perspective view showing a microwave oven including a fermenter according to another embodiment of the present invention.

FIG. 4 is an exploded perspective view showing a microwave oven including a fermenter according to another embodiment of the present invention.

As shown in the figure, a cooking chamber (not shown) for cooking food therein is defined in a cavity 61 of the microwave oven. In addition, the cooking chamber is selectively opened or closed by means of a cooking chamber door 63 installed pivotally to one side of the cavity 61.

Furthermore, an electric apparatus chamber 65 is provided in the cavity 61 at a position opposite to the cooking chamber. In the electric apparatus chamber 65 are installed electric parts for irradiating microwaves into the cooking chamber to cook food, a cooling fan for cooling the electric parts, and the like.

In addition, a control unit 67 is installed to an upper end of the door 63, and a heater cover 69 is installed to one side of the cavity 61 corresponding to a top side of the cooking chamber. The control unit 67 receives various operating signals such as fermentation temperature and fermenting time for operating the microwave oven and a fermenter 50, which will be explained later, and displays a variety of information on the operation of the microwave oven and the fermenter 50 to the outside. Further, the heater cover 69 serves to cover a heater which becomes a heat source.

The fermenter 50 is provided in the front of the electric apparatus chamber 65. A fermenter casing 51 defining an external appearance of the fermenter 50 generally takes the shape of a hexahedron with a rounded rear side. In addition, a fermenting chamber 53 is defined in the fermenter casing 51. The fermenting chamber 53 is a place where food is fermented, and food to be fermented is taken in or out of the fermenting chamber through an open front side of the fermenting casing.

Seating grooves 54 are formed in both lateral sides of the fermenting chamber 53, respectively. The seating grooves 54 are formed in such a manner that both lateral sides of the fermenting chamber 53 are partially depressed at a predetermined depth, and are formed at the middle portion of the lateral side of the fermenting chamber 53 to extend in a front and rear direction.

In addition, a partition 55 is detachably installed in the fermenting chamber 55 in a horizontal direction. Both lateral ends of the partition 55 are inserted into the seating grooves 54, respectively. The partition 55 is used to partition an inner space of the fermenting chamber 53 into upper and lower regions depending on the size and amount of food accommodated in the fermenting chamber 53, and is shaped into a plate corresponding to a horizontal section of the fermenting chamber 53.

Further, a fermenter door (not shown) for selectively opening or closing the fermenting chamber 53 is provided to a front side of the cavity 61. The fermenter door may be made at least partially of a transparent or translucent material such that a user can view the fermenting chamber 53 with his/her naked eyes.

A fermenting heater 57 is installed to an outer side of the fermenter casing 51. The fermenting heater 57 is used to heat and then ferment food accommodated in the fermenting chamber 53. The fermenting heater 57 is bent into a serpentine shape with a predetermined length and then attached to the outer side of the fermenter casing 51. The length and position of the fermenting heater 57 attached to the outer side of the fermenter casing 51 will be determined depending on the heating performance of the fermenting heater 57.

In addition, a temperature sensor (not shown) is installed to a specific position on the outer surface of the fermenter casing 51. The temperature sensor detects an internal temperature of the fermenting chamber 53 and then sends the detected temperature to the control unit 67. For example, the temperature sensor may be a thermostat.

Furthermore, a shielding plate 59 is installed in the electric apparatus chamber 65 at a position between the fermenter casing 51 and electric parts in the electric apparatus chamber 65. The shielding plate 59 serves to prevent heat of the fermenting heater 57 from being transferred to the electric parts installed in the electric apparatus chamber 65 or to prevent heat, which is generated during the operation of the electric parts while the fermenter 50 is in a stopped state, from being transferred to the fermenter 50. The shielding plate 59 is made of a material capable of sufficiently shielding the heat from the fermenting heater 57.

Next, a method of controlling a microwave oven including a fermenter according to another embodiment of the present invention will be described in detail with reference to the accompanying drawings.

Figure 5:
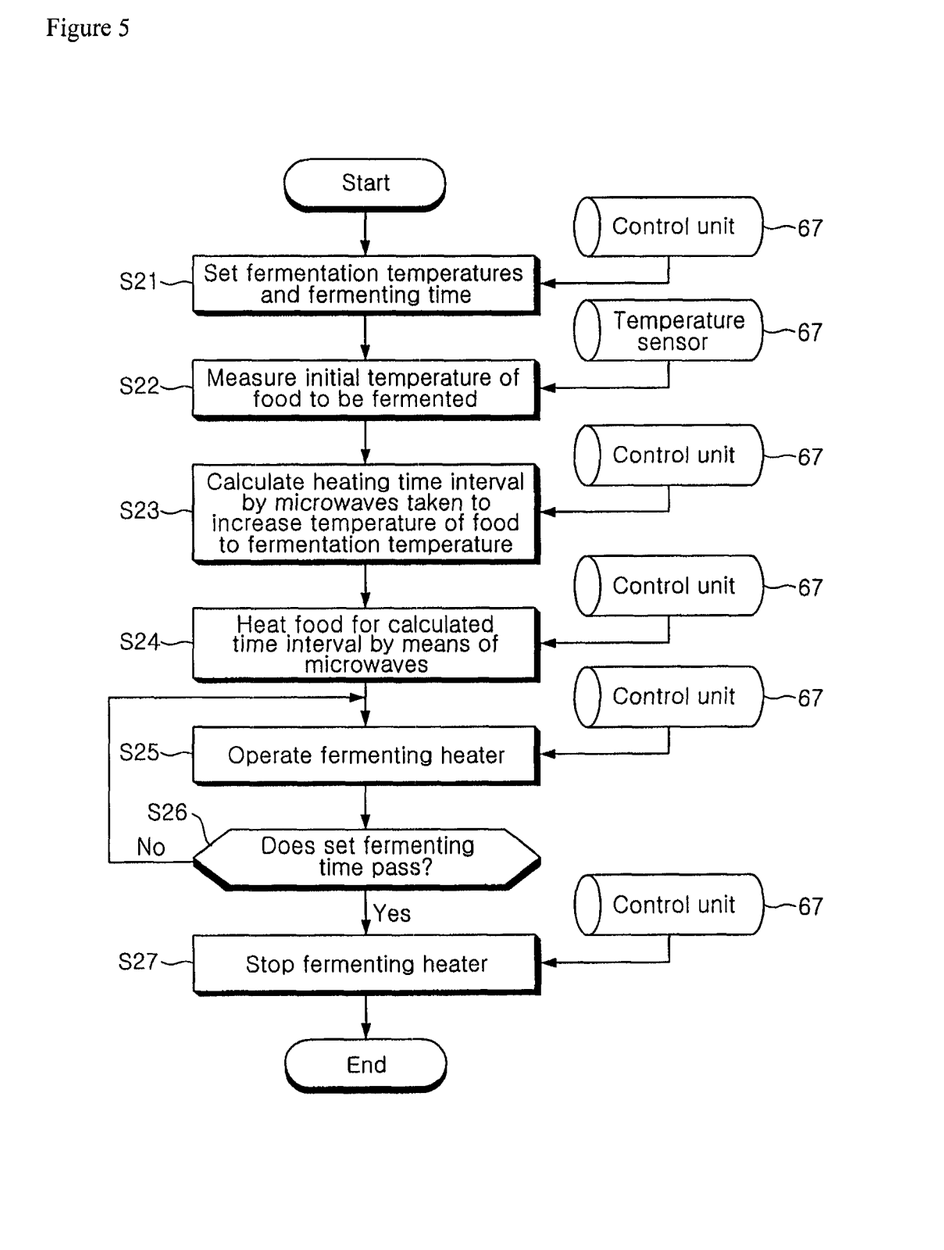
FIG. 5 is a flowchart illustrating a method of controlling the microwave oven including the fermenter according to another embodiment of the present invention.

FIG. 5 is a flowchart illustrating the method of controlling a microwave oven including a fermenter according to another embodiment of the present invention.

As shown in the figure, a fermenter door is first opened to open the fermenting chamber 53 and food to be fermented (e.g., milk) is then accommodated in the fermenting chamber 53, and the fermenter door is further closed to shield the fermenting chamber 53. At this time, the partition plate 55 is selectively installed in the fermenting chamber 53 depending on the size and amount of the food.

If the food is received in the fermenting chamber 53, the control unit 67 is operated to set a fermentation temperature and a fermenting time depending on the amount and kind of the food (S21). In addition, the temperature sensor detects an inner temperature of the fermenting chamber 53, and the control unit 67 calculates an initial temperature of the milk based on the internal temperature of the fermenting chamber 53 detected by the temperature sensor (S22). Further, the control unit 67 calculates a time interval taken to reach the set fermentation temperature of the milk, e.g. 43 to 50.degree. C., from the initial temperature and then displays the calculated time interval to the outside (S23).

If the food is received in the fermenting chamber 53, the control unit 57 is operated to set a fermentation temperature depending on the amount and kind of the food (S21). In addition, the temperature sensor detects an inner temperature of the fermenting chamber 53, and the control unit 67 calculates an initial temperature of the milk based on the internal temperature of the fermenting chamber 53 detected by the temperature sensor (S22). Further, the control unit 67 calculates a time interval taken to reach the set fermentation temperature of the milk, e.g. 43 to 50° C., from the initial temperature and then displays the calculated time interval to the outside (S23).

After the initial temperature of the milk has been measured and the time interval taken to reach the set fermentation temperature from the initial temperature of the milk has been calculated as described above, the fermenting door is opened in order for the user to take the milk out of the fermenting chamber 53. In addition, the door 63 is opened to take the milk into the cooking chamber, and then the door 63 is closed to close the cooking chamber.

In such a state, if the user manipulates the control unit 67 to operate the microwave oven, the milk is heated for the calculated time interval by means of microwaves or heater (S24). Thus, the milk in the cooking chamber changes from its initial temperature to its set temperature. Since the food is beforehand heated to the set temperature by the microwave oven before it is fermented in the fermenter 50, it is possible to significantly reduce a time interval taken to ferment the food using the fermenter 50. Therefore, the user can ferment the food more rapidly.

If the temperature of the milk reaches the set temperature, the door 63 is opened to take the milk out of the cooking chamber, and enzymes such as lactobacillus are put into the milk. Then, the fermenter door is opened to take the milk into the fermenting chamber 53, and the controller unit 67 is operated to supply current to the heater 57. As a result, the fermentation of the milk is started (S25). Thus, if the heat from the heater 57 is transferred into the fermenting chamber 53 to heat the food, the food is fermented through a catalytic reaction due to enzymes already put into the food.

Meanwhile, while the food is being fermented, the internal temperature of the fermenting chamber 53 is detected by the temperature sensor and sent to the control unit 67. If the internal temperature of the fermenting chamber 53 sent from the temperature sensor exceeds a predetermined set temperature, the control unit 67 temporarily stops the operation of the fermenting heater 57 to allow the internal temperature of the fermenting-teed chamber 53 to be maintained at a predetermined value.

In addition, if the set fermenting time passes, the control unit 67 stops the operation of the fermenting heater 57 (S26 and S27). In addition, the fermenter door is opened to take the food out of the fermenting chamber 53, and thus, the fermentation of the food is finished.

Furthermore, the shielding plate 59 installed between the fermenter casing 51 and the electric parts in the electric apparatus chamber 65 prevents the heat of the fermenting heater 57 from being transferred to the electric parts. Thus, it is possible to prevent the electric parts in the electric apparatus chamber 65 from being damaged due to the heat generated from the fermenting chamber 57 while the fermenter 50 is being operated.

While the invention has been shown and described with respect to the preferred embodiments, it will be understood by the skilled in the art that various changes and modifications may be made thereto without departing from the spirit and scope of the invention defined by the appended claims. Accordingly, the present invention should be construed as being defined by the appended claims.

INDUSTRIAL APPLICABILITY

According to the present invention, the following effects can be expected.

First, since a fermenter capable of fermenting food is provided to one side of a microwave oven, it is possible to cook and also ferment food using a single microwave oven. Thus, since a microwave oven with various functions can be produced, so that the needs of consumers can be satisfied.

Further, a thermoelectric element installed to the fermenter to ferment food and store the fermented food at a specific temperature. Thus, it is not necessary to store food, which has been fermented in the fermenter, in a refrigerator for a long time. Further, the fermented food is neither excessively fermented nor goes bad due to the long storage in the fermenter.

In addition, the consumers can reduce the costs as compared with when they buy and use individually a microwave oven and a UV sterilizer. Also, a kitchen space can be more efficiently utilized since only one product is installed in the kitchen.

Furthermore, a fermenting chamber of the fermenter can be partitioned depending on the size and amount of food. Therefore, it is possible to ferment a large amount of foods more efficiently by using the fermenter.

The invention claimed is:

1. A method of controlling a microwave oven including a fermenter, the fermenter being provided at one side of the microwave oven, the method comprising:
receiving a predetermined fermentation temperature and a predetermined fermenting time from a controller;
detecting, an initial temperature of food to be fermented by a temperature sensor, which is accommodated in a fermenting chamber of the fermenter;
calculating a time interval taken to heat the food from the detected initial temperature to the predetermined fermentation temperature, by the controller;
controlling irradiation of microwaves into a cooking chamber of the microwave oven during the calculated time interval to heat food received in the cooking chamber, by the controller;
controlling operation of a fermenting heater, by the controller, when a temperature of the food reaches the predetermined fermentation temperature; and
stopping the fermenting heater, by the controller, when the fermenting heater is operated for the predetermined fermenting time.

2. The method as claimed in claim 1, wherein controlling operation of the fermenting heater comprises:
initiating operation of the fermenting heater by the controller;
detecting an internal temperature of the fermenting chamber by the temperature sensor;
comparing, by the controller, the predetermined fermentation temperature with the detected internal temperature of the fermenting chamber; and
continuing operation of the fermenting heater or stopping operation of the fermenting heater based on a result of the comparison to allow the detected internal temperature of the fermenting chamber to be less than or equal to the predetermined fermentation temperature.

3. The method as claimed in claim 2, wherein continuing operation of the fermenting heater or stopping operation of the fermenting heater comprises:
cutting off current supplied to the fermenting heater, by a safety device, when the detected internal temperature of the fermenting chamber is greater than the predetermined fermentation temperature by a predetermined value.

4. The method as claimed in claim 2, wherein further controlling operation of the fermenting heater comprises continuing operation of the fermenting heater or stopping operation of the fermenting heater, comprising:
cutting off current supplied to the fermenting heater when the detected internal temperature of the fermenting chamber is greater than the predetermined fermentation temperature by a predetermined value.

5. The method as claimed in claim 1, wherein controlling operation of the fermenting heater comprises:
controlling current supplied to a thermoelectric element, by the controller, such that the thermoelectric element generates heat;
detecting an internal temperature of the fermenting chamber by the temperature sensor; and
controlling the current supplied to the thermoelectric element, by the controller, such that the thermoelectric element absorbs heat when the detected internal temperature of the fermenting chamber reaches the predetermined fermentation temperature.

6. The method as claimed in claim 5, further comprising:
detecting the internal temperature of the fermenting chamber by the temperature sensor again after the detected internal temperature of the fermenting chamber reaches the predetermined fermentation temperature; and
cutting off the current supplied to the thermoelectric element, by the controller, when the detected internal temperature of the fermenting chamber reaches a predetermined storage temperature.

7. The method as claimed in claim 5, wherein controlling the current supplied to the thermoelectric element, by the controller, such that the thermoelectric element generates heat, comprises:

comparing the predetermined fermentation temperature with the detected internal temperature of the fermenting chamber by the controller;

controlling the current supplied to the thermoelectric element, by the controller, such that the thermoelectric element generates heat, based on the comparison result; and     cutting off the current supplied to the thermoelectric element, by a safety device, when the controller controls a continuous supply of current to the thermoelectric element such that the thermoelectric element generates heat and the detected internal temperature of the fermenting chamber is greater than the predetermined fermentation temperature by a predetermined value.

8. The method as claimed in claim 5, wherein cutting off the current supplied to the thermoelectric element, by the controller, when the detected internal temperature of the fermenting chamber reaches the predetermined storage temperature comprises:

comparing the predetermined storage temperature with the detected internal temperature of the fermenting chamber by the controller;

controlling the current supplied to the thermoelectric element, by the controller, such that the thermoelectric element absorbs heat when the detected internal temperature of the fermenting chamber reaches the predetermined fermentation temperature based on the comparison result; and     cutting off the current supplied to the thermoelectric element, by a safety device, when the controller controls a continuous supply of current to the thermoelectric element such that the thermoelectric element absorbs heat and the detected internal temperature of the fermenting chamber is less than the predetermined storage temperature by a predetermined value.

9. A method of controlling a microwave oven including a fermenter, the method comprising:

receiving a predetermined fermentation temperature and a predetermined fermenting time from a controller;

detecting an initial temperature of food to be fermented by a temperature sensor, the food being received in a fermenting chamber of the fermenter;

calculating a microwave heating time to heat the food received in the fermenting chamber from the detected initial temperature to the predetermined fermentation temperature using a microwave cooking function of the microwave oven and heating the food for the calculated microwave heating time in accordance with the microwave heating function;

controlling operation of a fermenting heater when a temperature of the food reaches the predetermined fermentation temperature and the microwave cooking function is terminated; and     stopping operation of the fermenting heater when the fermenting heater is operated for the predetermined fermenting time.

10. The method as claimed in claim 9, wherein controlling operation of a fermenting heater comprises:

initiating operation of the fermenting heater;

detecting an internal temperature of the fermenting chamber;

comparing the predetermined fermentation temperature to the detected internal temperature of the fermenting chamber; and     further controlling operation of the fermenting heater based on a result of the comparison to allow the detected internal temperature of the fermenting chamber to be less than or equal to the predetermined fermentation temperature.

\* \* \* \* \*